US012642345B1

(12) United States Patent
Zhou

(10) Patent No.: US 12,642,345 B1
(45) Date of Patent: *Jun. 2, 2026

(54) MULTIFUNCTIONAL COSMETIC MIRROR

(71) Applicant: Jintong Zhou, Shenzhen (CN)

(72) Inventor: Jintong Zhou, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/011,621

(22) Filed: Jan. 7, 2025

(30) Foreign Application Priority Data

Dec. 16, 2024 (CN) .......................... 202423100110.3

(51) Int. Cl.
*A45D 42/04* (2006.01)
*A45D 42/10* (2006.01)
*A45D 42/16* (2006.01)
*G02B 7/182* (2021.01)

(52) U.S. Cl.
CPC ............. *A45D 42/04* (2013.01); *A45D 42/10* (2013.01); *A45D 42/16* (2013.01); *G02B 7/182* (2013.01)

(58) Field of Classification Search
CPC ........ A45D 42/00; A45D 42/04; A45D 42/10; A45D 42/16; A47G 1/04; A47G 1/16; A47G 1/17; A47G 2001/1673; G02B 7/182; G02B 7/198
USPC ................ 359/838, 881; 362/136, 140, 142; 248/467, 474, 479, 494
See application file for complete search history.

(56) References Cited

U.S. PATENT DOCUMENTS

| | | | | |
|---|---|---|---|---|
| 6,206,530 B1* | 3/2001 | Eberts | .................... | A45D 42/08 |
| | | | | 359/881 |
| 7,090,378 B1* | 8/2006 | Zadro | .................... | A45D 42/10 |
| | | | | 362/144 |
| D549,968 S * | 9/2007 | Pitot | .............................. | D6/312 |
| 7,393,115 B2* | 7/2008 | Tokushita | ............ | A45D 33/006 |
| | | | | 132/288 |
| 10,016,045 B1* | 7/2018 | Hollinger | ................ | A45D 42/00 |
| 2006/0077654 A1* | 4/2006 | Krieger | .................. | A45D 42/04 |
| | | | | 362/183 |
| 2017/0164719 A1* | 6/2017 | Wheeler | ................ | A45D 42/10 |
| 2019/0313815 A1* | 10/2019 | Seidler | .................... | A45D 42/04 |
| 2019/0374007 A1* | 12/2019 | Kaiser | .................... | A45D 42/10 |

\* cited by examiner

*Primary Examiner* — Ricky D Shafer
(74) *Attorney, Agent, or Firm* — Nicholas Makridakis

(57) ABSTRACT

A multifunctional cosmetic mirror is provided, including a mirror body, a lighting unit, a magnetic base, a rotary seat, and a support arm. The lighting unit is set on the mirror body, the rotary seat is rotatably installed on the mirror body, one end of the support arm is pivotally installed on the rotary seat, and another end of the support arm is pivotally installed on the magnetic base. The magnetic base is provided with a caulking groove for embedding the support arm, and the mirror body is provided with a locating groove for embedding the magnetic base. In addition to provide users with a mirror for use, the cosmetic mirror also has functions such as shooting fill light, using as a phone holder to support the phone, lighting, etc., making its functions more diversified and meeting more different usage needs of the users, which is helpful to promote.

10 Claims, 8 Drawing Sheets

MULTIFUNCTIONAL COSMETIC MIRROR

CROSS REFERENCE TO RELATED APPLICATION

This application claims priority to Chinese Patent Application No. 2024231001103, filed on Dec. 16, 2024, which is hereby incorporated by reference in its entirety.

TECHNICAL FIELD

The present application relates to the technical field of cosmetic mirrors, and specifically to a multifunctional cosmetic mirror.

BACKGROUND

Cosmetic mirror, as a commonly used tool for makeup, generally includes a mirror base and a mirror, the mirror is set on the mirror base. When in use, users may view their appearance through the mirror for makeup purposes. The existing cosmetic mirrors have the advantages of being small, lightweight, easy to store, and convenient for makeup repair. However, due to the fact that the existing cosmetic mirrors are only used by users to look at the mirror, their functions are relatively single and cannot meet the needs of users for more use.

SUMMARY

To overcome the shortcomings of existing technologies, the present disclosure aims to provide a multifunctional cosmetic mirror with diverse functions that can meet the diverse needs of users.

The above objectives are achieved by adopting the following technical solutions.

In some embodiments of the present disclosure, a multifunctional cosmetic mirror is provided, including a mirror body, a lighting unit, a magnetic base, a rotary seat, and a support arm. Herein the lighting unit is set on the mirror body, the rotary seat is rotatably installed on the mirror body, one end of the support arm is pivotally installed on the rotary seat, and another end of the support arm is pivotally installed on the magnetic base. The magnetic base is provided with a caulking groove for embedding the support arm, and the mirror body is provided with a locating groove for embedding the magnetic base.

The mirror body includes a mirror base and a mirror, and the mirror is set on the mirror base.

The rotary seat is rotatably installed on the mirror base.

An elastic positioning member is provided between the rotary seat and the mirror base for positioning the rotary seat on the mirror base.

The mirror base includes a base and a top cover, the lighting unit is located in a cavity enclosed by the top cover and the base. The top cover includes a main body, and the mirror is set on the main body. The lighting unit includes a light panel and multiple lights set on the light panel, the top cover further includes a light transmission part facing the multiple lights, and the light transmission part is arranged around a periphery of the main body.

The magnetic base is configured for magnetic adsorption onto the mirror body.

The magnetic base is a base provided with a magnet.

The support arm is pivotally installed on the rotary seat through a first support shaft, the support arm is provided with a first mounting cavity, and the first support shaft is installed inside the first mounting cavity. The rotary seat is provided with a first insertion hole, and the first support shaft is inserted into the first insertion hole.

The support arm is pivotally installed on the magnetic base through a second support shaft, the support arm is provided with a second mounting cavity, and the second support shaft is installed inside the second mounting cavity. The magnetic base is provided with a second insertion hole, and the second support shaft is inserted into the second insertion hole.

The magnetic base is configured for magnetic adsorption onto mobile phones.

Compared with the existing technologies, the multifunctional cosmetic mirror of the present disclosure has at least the following beneficial effects and advantages.

The multifunctional cosmetic mirror of the present disclosure, by adopting the combination of the mirror body, the lighting unit, the magnetic base and the support arm, in addition to provide users with a mirror for use, it also has functions such as shooting fill light, using as a phone holder to support the phone, lighting, etc., making its functions more diversified and meeting more different usage needs of the users, which is helpful to promote. Moreover, it is also convenient for storage, and carrying when going out.

Figure 1:
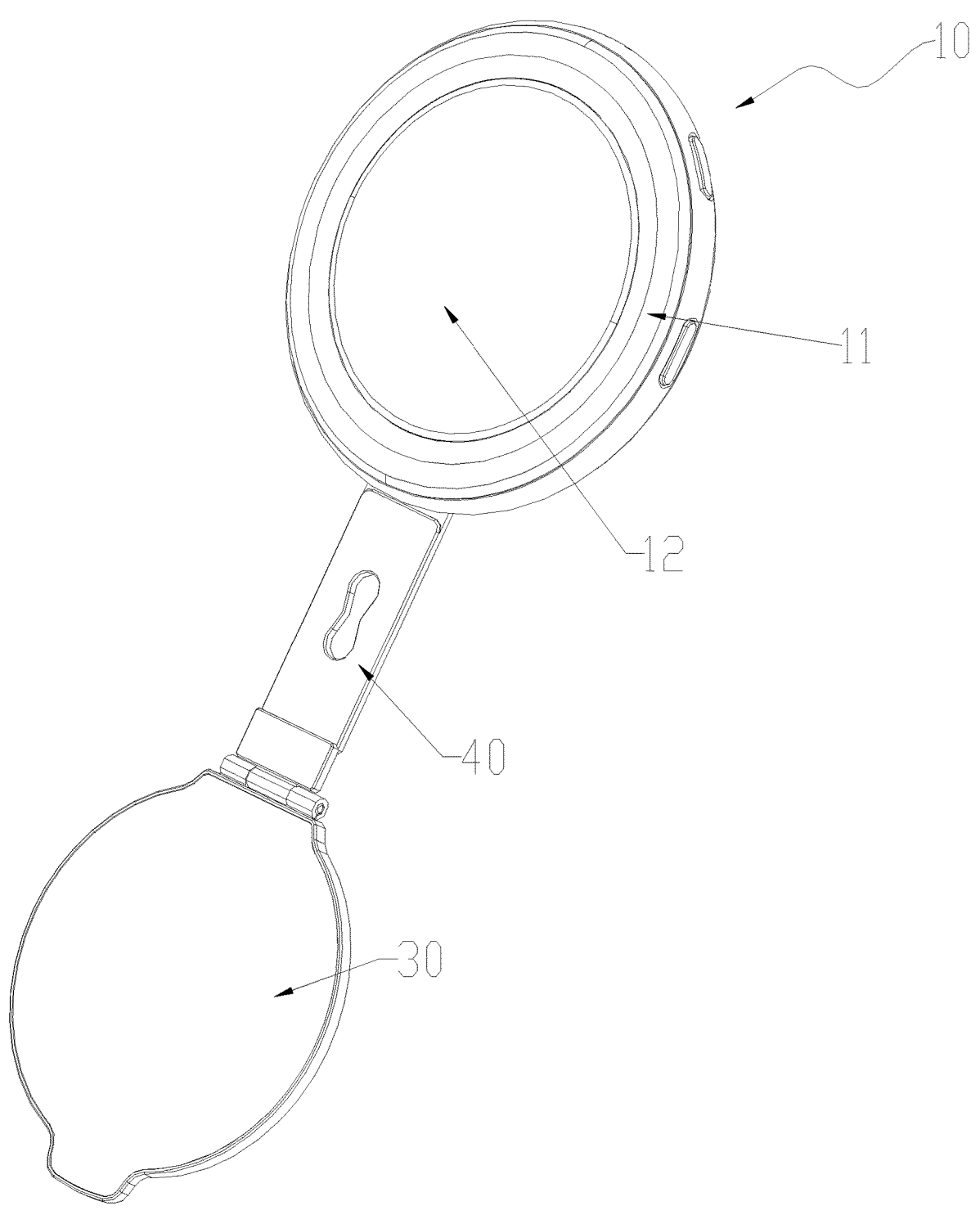
FIG. 1 shows a structural schematic diagram of a multifunctional cosmetic mirror in accordance with some embodiments of the present disclosure.
Figure 2:
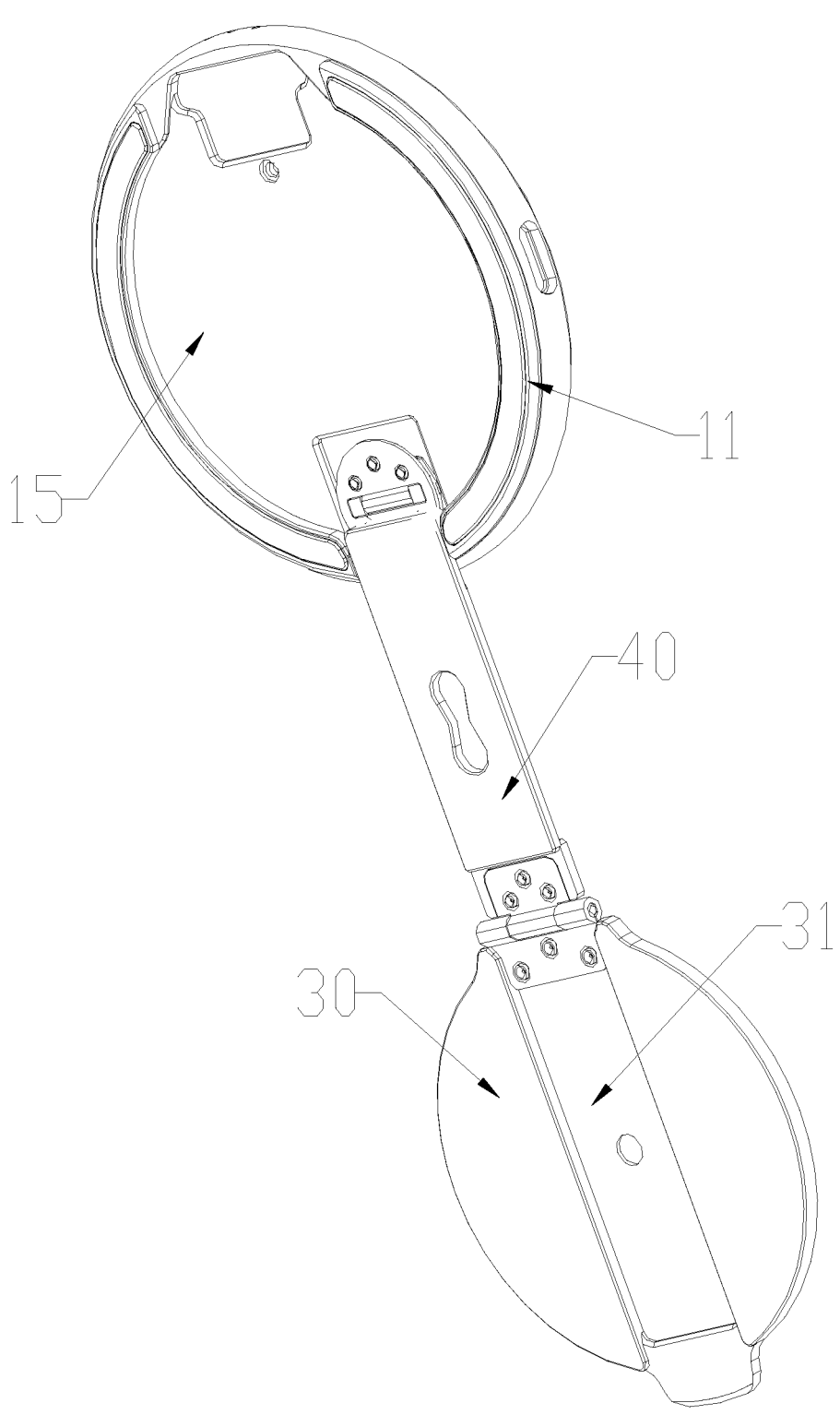
FIG. 2 shows a back view of FIG. 1.
Figure 3:
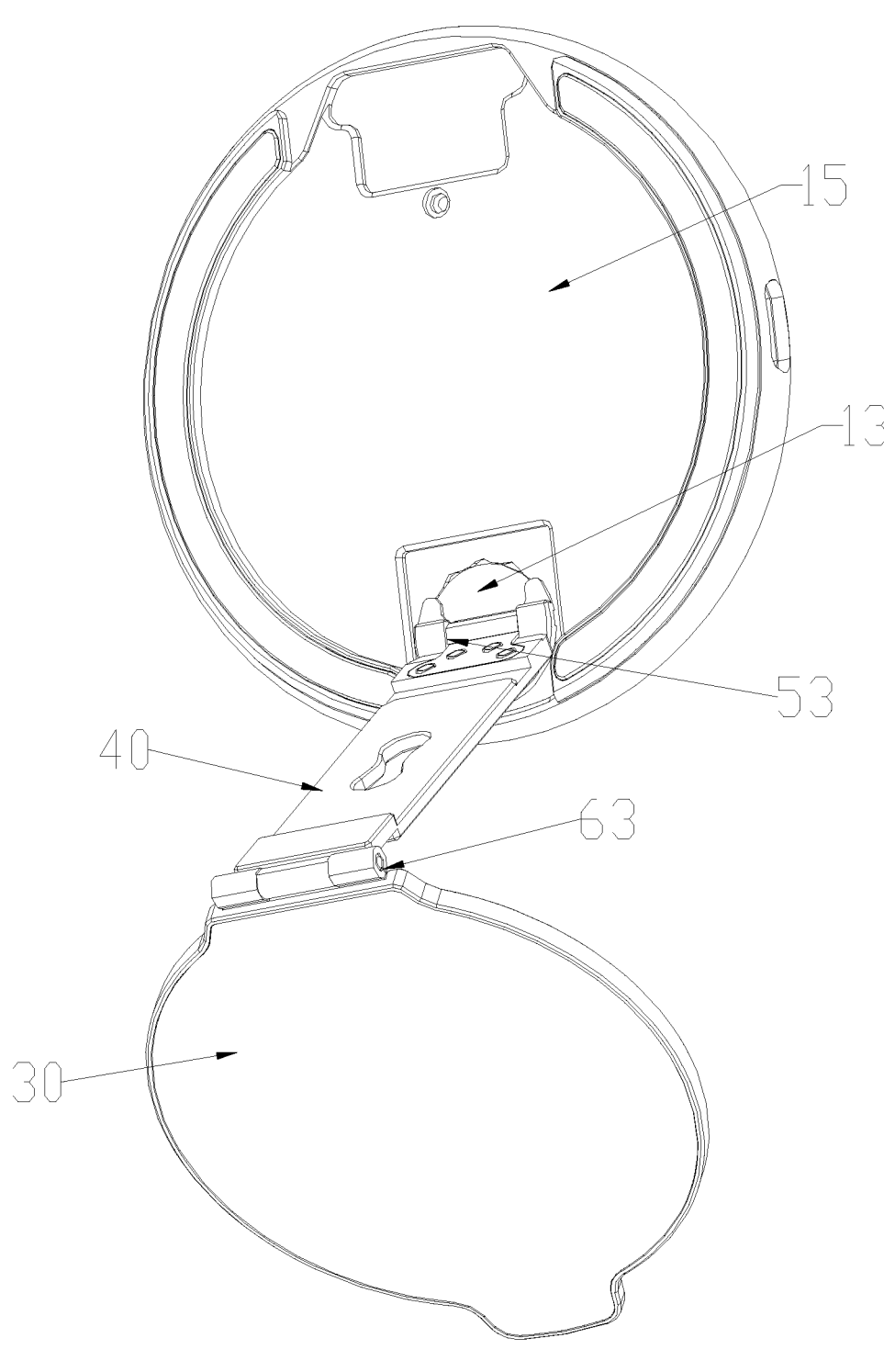
FIG. 3 shows a structural schematic diagram of another state of the multifunctional cosmetic mirror in accordance with some embodiments of the present disclosure.
Figure 4:
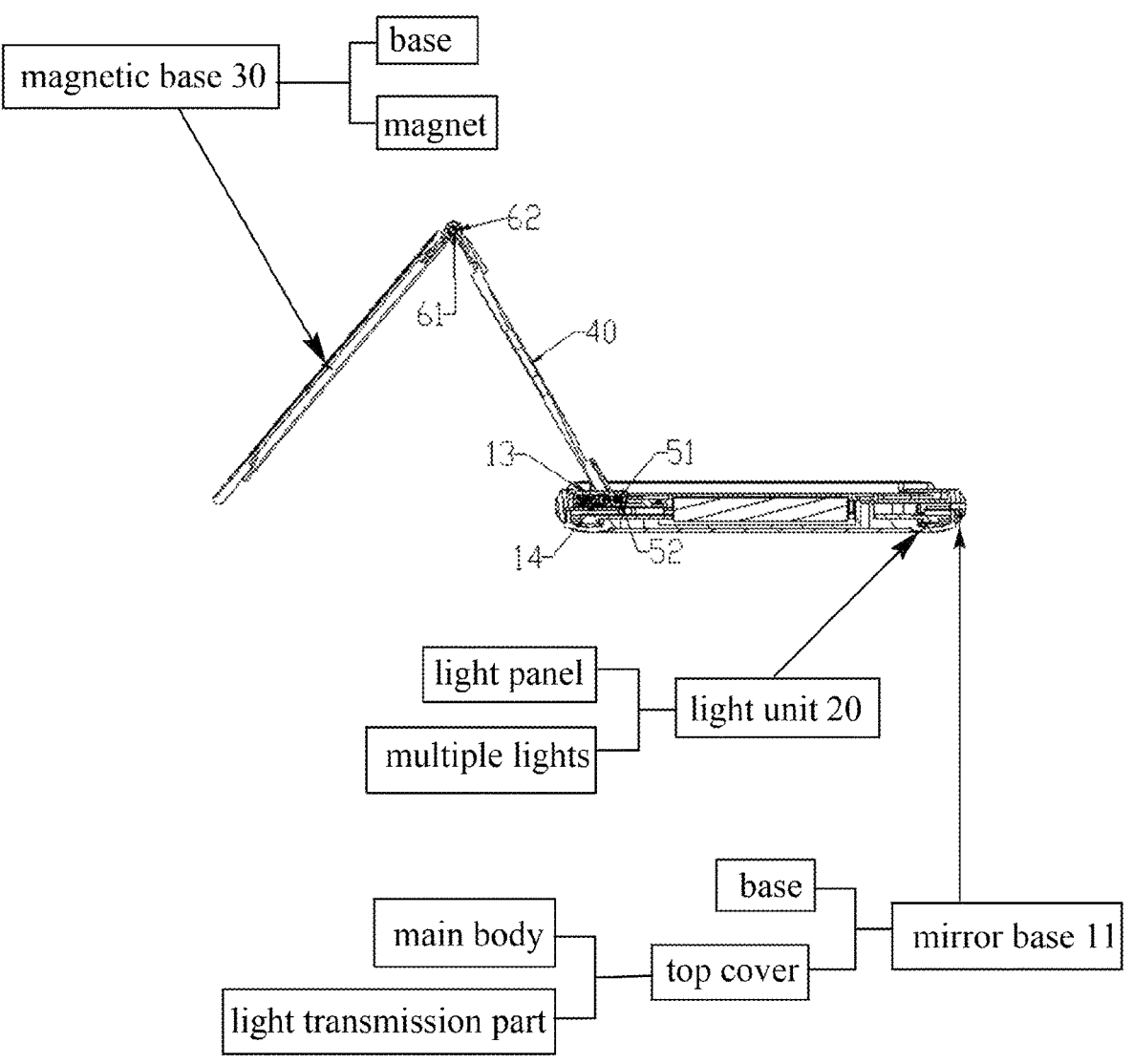
FIG. 4 shows a sectional view along a middle of the multifunctional cosmetic mirror under another state in accordance with some embodiments of the present disclosure.

In the drawings, reference numerals are as follows. 10. Mirror body, 11. Mirror base, 12. Mirror, 13. Rotary seat, 14. Elastic positioning member, 15. Locating groove, 20. Lighting unit, 30. Magnetic base, 31. Caulking groove, 40. Support arm, 51. First support shaft, 52. First mounting cavity, 53. First insertion hole, 61. Second support shaft, 62. Second mounting cavity, 63. Second insertion hole, 71. First hinge block, 72. Second hinge block, 73. Third hinge block, 81. First junction, 82. Connecting block, 83. Second junction.

DETAILED DESCRIPTION OF THE EMBODIMENTS

The multifunctional cosmetic mirror of the present disclosure will be further described in conjunction with the accompanying drawings and specific embodiments below. It should be noted that, under the premise of no conflict, the various embodiments or technical features described below may be combined arbitrarily to form new embodiments.

As shown in FIG. 1 to FIG. 7, in some embodiments of the present disclosure, a multifunctional cosmetic mirror is provided, including a mirror body 10, a lighting unit 20, a magnetic base 30, a rotary seat 13, and a support arm 40. The lighting unit 20 is set on the mirror body 10, the rotary seat 13 is rotatably installed on the mirror body 10, one end of the support arm 40 is pivotally installed on the rotary seat 13, and another end of the support arm 40 is pivotally installed on the magnetic base 30. The magnetic base 30 is provided with a caulking groove 31 for embedding the support arm 40, and the mirror body 10 is provided with a locating groove 15 for embedding the magnetic base 30. The magnetic base 30 is used for magnetic adsorption onto mobile phones.

Figure 5:
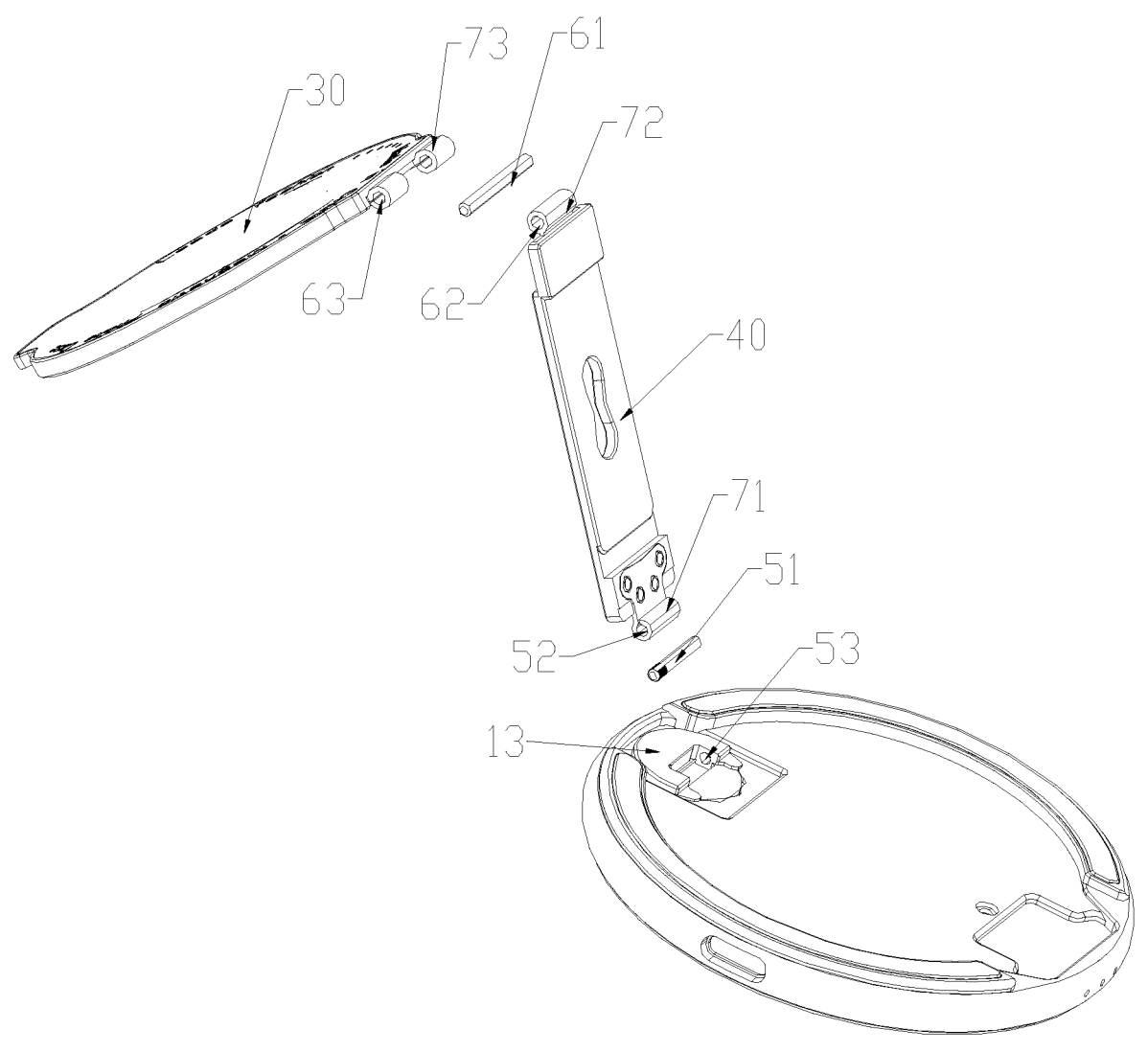
FIG. 5 shows an exploded view of the multifunctional cosmetic mirror in accordance with some embodiments of the present disclosure.
Figure 6:
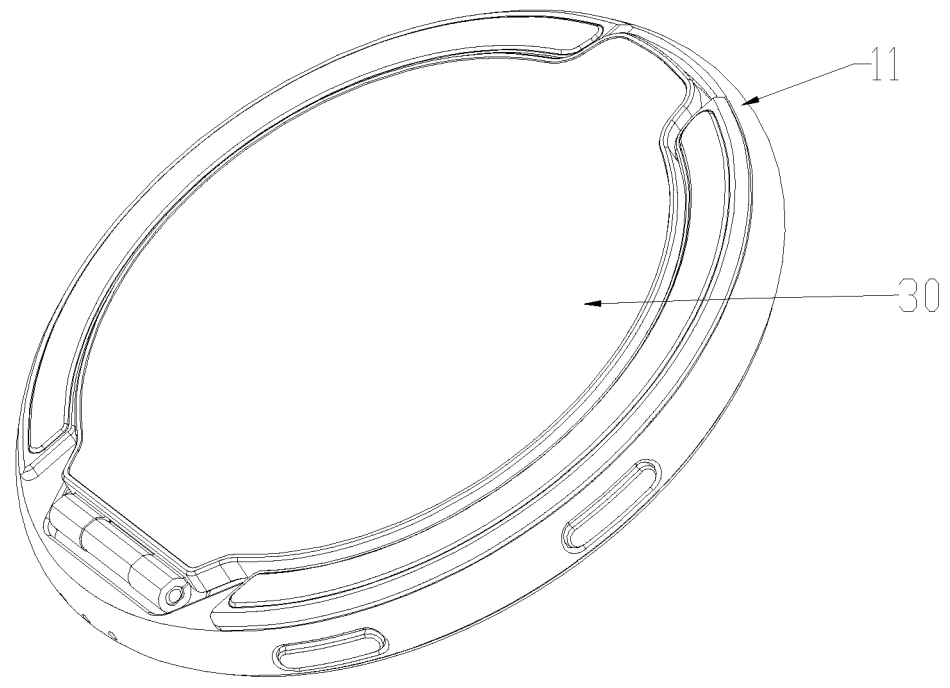
FIG. 6 shows a schematic diagram of a storage state of the multifunctional cosmetic mirror in accordance with some embodiments of the present disclosure.
Figure 7:
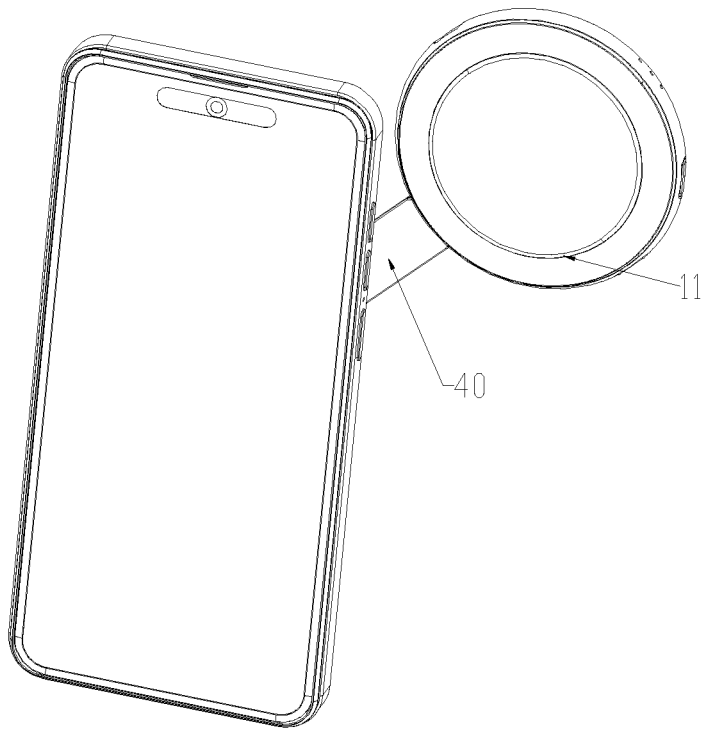
FIG. 7 shows a schematic diagram of a usage state of the multifunctional cosmetic mirror in accordance with some embodiments of the present disclosure.

When in use, the mirror body 10 is available for a user to use as a mirror. Moreover, the user can magnetically attach the magnetic base 30 to its mobile phone and swing the support arm 40 relative to the magnetic base 30 to bring the mirror body 10 closer to the mobile phone. the rotary seat 13 can also be rotated relative to the mirror body 10, by flexibly adjusting the positions of the support arm 40 and the mirror body 10, the lighting unit 20 can be used to provide supplementary light for shooting (as shown in FIG. 7). In addition, the mirror body 10 can be placed on a support surface such as a desktop, and then the support arm 40 can be swung relative to the mirror body 10 and the rotary seat 13, and the mobile phone can be magnetically attracted to the magnetic base 30 (as shown in FIG. 5) to use the multifunctional cosmetic mirror as a mobile phone holder to support the mobile phone, making it convenient for the user to watch movies. Moreover, the user can magnetically attach its mobile phone to the magnetic base 30 in a horizontal or vertical manner according to its usage needs. In addition, the magnetic base 30 can be placed on the support surface such as the desktop, and then the support arm 40 can be swung relative to the mirror body 10 to use the lighting unit 20 of the mirror body 10 for illumination, making it suitable for use as a night light.

Therefore, the multifunctional cosmetic mirror of the present disclosure, by adopting the combination of the mirror body 10, the lighting unit 20, the magnetic base 30, and the support arm 40, and due to one end of the support arm 40 being pivotally installed on the rotary seat 13 and the other end of the support arm 40 being pivotally installed on the magnetic base 30, the support arm 40 can be swung to different angles relative to the mirror body 10 and the rotary seat 13, and the support arm 40 can be swung to different angles relative to the mirror body 10, allowing for flexible adjustment of the positions of the mirror body 10 and the magnetic base 30. The rotary seat 13 can also be rotated relative to the mirror body 10, allowing for further flexible adjustment of the support arm 40. In addition to providing the user with a mirror, it also has functions such as shooting fill light, serving as the mobile phone holder to support the mobile phone, lighting, etc., making its functions more diversified and meeting more different usage needs of the user, which is helpful to promote. During the storage process of the multifunctional cosmetic mirror, the support arm 40 can be embedded into the caulking groove 31, and then the magnetic base 30 can be embedded into the locating groove 15, which can reduce the overall volume, facilitate storage, and make it easy to carry when going out.

The magnetic base 30 is further used to magnetically attract onto the mirror body 10. When the magnetic base 30 is embedded into the locating groove 15, the stability of the magnetic base 30 embedded into the locating groove 15 can be improved by magnetically attracting it onto the mirror body 10.

The mirror body 10 includes a mirror base 11 and a mirror 12, and the mirror 12 is set on the mirror body 11. In this design, it is convenient to produce.

In some preferred embodiments of the present disclosure, the mirror base 11 is provided with a groove, and the mirror 12 is embedded in the groove, making it convenient for the installation and positioning of the mirror 12.

The rotary seat 13 is rotatably installed on the mirror base 11. When in use, the rotary seat 13 can also be horizontally rotated to different orientations, allowing for further flexible adjustment of the position of the support arm 40.

After the rotary seat 13 is horizontally rotated into place, it can be positioned on the mirror base 11 through its frictional force with the mirror base 11 to avoid any random shaking of the rotary seat 13.

In some preferred embodiments of the present disclosure, an elastic positioning member 14 is provided between the rotary seat 13 and the mirror base 11 for positioning the rotary seat 13 on the mirror base 11, so that after the rotary seat 13 is horizontally rotated into place, the rotary seat 13 can be positioned on the mirror base 11 through the elastic positioning member 14 to improve the stability of positioning the rotary seat 13.

Herein, the elastic positioning member 14 may be a combination of a spring and ball plungers, or various existing elastic positioning members 14 such as ball plungers.

The lighting unit 20 is arranged on the mirror base 11 for ease of setting up the lighting unit 20.

In some preferred embodiments of the present disclosure, the lighting unit 20 is an LED lighting unit and can be set to various lighting modes such as white light, warm light, and warm white light.

In some preferred embodiments of the present disclosure, the mirror base 11 includes a base and a top cover, the lighting unit 20 is located in a cavity enclosed by the top cover and the base, the top cover comprises a main body. The top cover includes a main body, and the mirror 12 is arranged on the main body. The lighting unit 20 includes a light panel and multiple lights set on the light panel. The top cover further includes a light transmission part facing the multiple lights, and the light transmission part is arranged around a periphery of the main body, so that the light emitted by the light-emitting elements of the lighting unit 20 can be emitted through the light transmission part. Specifically, the groove is disposed on the top cover.

Herein the lights may be a luminous element such as LED beads.

Of course, in addition to these, the lighting unit 20 can also be set according to actual needs, as long as it can play a lighting role. However, the lighting unit 20 adopts the combination of the light panel and the lights, which is the most preferred embodiments of the present disclosure, this can ensure the lighting effect.

Herein, the magnetic base 30 is a base provided with a magnet. Of course, in addition to this, the magnetic base 30 can also adopt other structures as long as it can be used for magnetic attraction on the mobile phones or the mirror body 10.

The support arm 40 is pivotally installed on the rotary seat 13 through a first support shaft 51, the support arm 40 is provided with a first mounting cavity 52, and the first support shaft 51 is installed inside the first mounting cavity 52. The rotary seat 13 is provided with a first insertion hole 53, and the first support shaft 51 is inserted into the first insertion hole 53. When in use, the support arm 40 can swing relative to the mirror body 10, and after the swing is in place, the support arm 40 can be positioned by the friction between the first support shaft 51 and the mirror body 10, as well as the friction between the first support shaft 51 and the support arm 40, to prevent the support arm 40 from swinging relative to the mirror body 10 at will.

Of course, in addition to above, the support arm 40 can also be pivotally installed on the rotary seat 13 in other ways. However, the realization that the support arm 40 can be pivotally installed on the rotary seat 13 by the above means is the optimal implementation mode of the present disclosure, which can be convenient for installation.

The support arm 40 is pivotally installed on the magnetic base 30 through a second support shaft 61, the support arm 40 is provided with a second mounting cavity 62, and the second support shaft 61 is installed inside the second mounting cavity 62. The magnetic base 30 is provided with a second insertion hole 63, and the second support shaft 61 is inserted into the second insertion hole 63. When in use, the support arm 40 can swing relative to the magnetic base 30, and after the swing is in place, the support arm 40 can be positioned by the friction between the second support shaft 61 and the magnetic base 30, as well as the friction between the second support shaft 61 and the support arm 40, to prevent the support arm 40 from swinging relative to the magnetic base 30 at will.

Of course, in addition to above, the support arm 40 can also be pivotally installed on the magnetic base 30 in other ways. However, the realization that the support arm 40 can be pivotally installed on the magnetic base 30 by the above means is the optimal implementation mode of the present disclosure, which can be convenient for installation.

The support arm 40 includes a main arm body, a first hinge block 71 connected to one end of the main arm body, and a second hinge block 72 connected to the other end of the main arm body. The first mounting cavity 52 is set on the first hinge block 71, and the second mounting cavity 62 is set on the second hinge block 72. The magnetic base 30 includes a main seat and a third hinge block 73 connected to the main seat, and the second mounting cavity 62 is set on the third hinge block 73.

Figure 8:
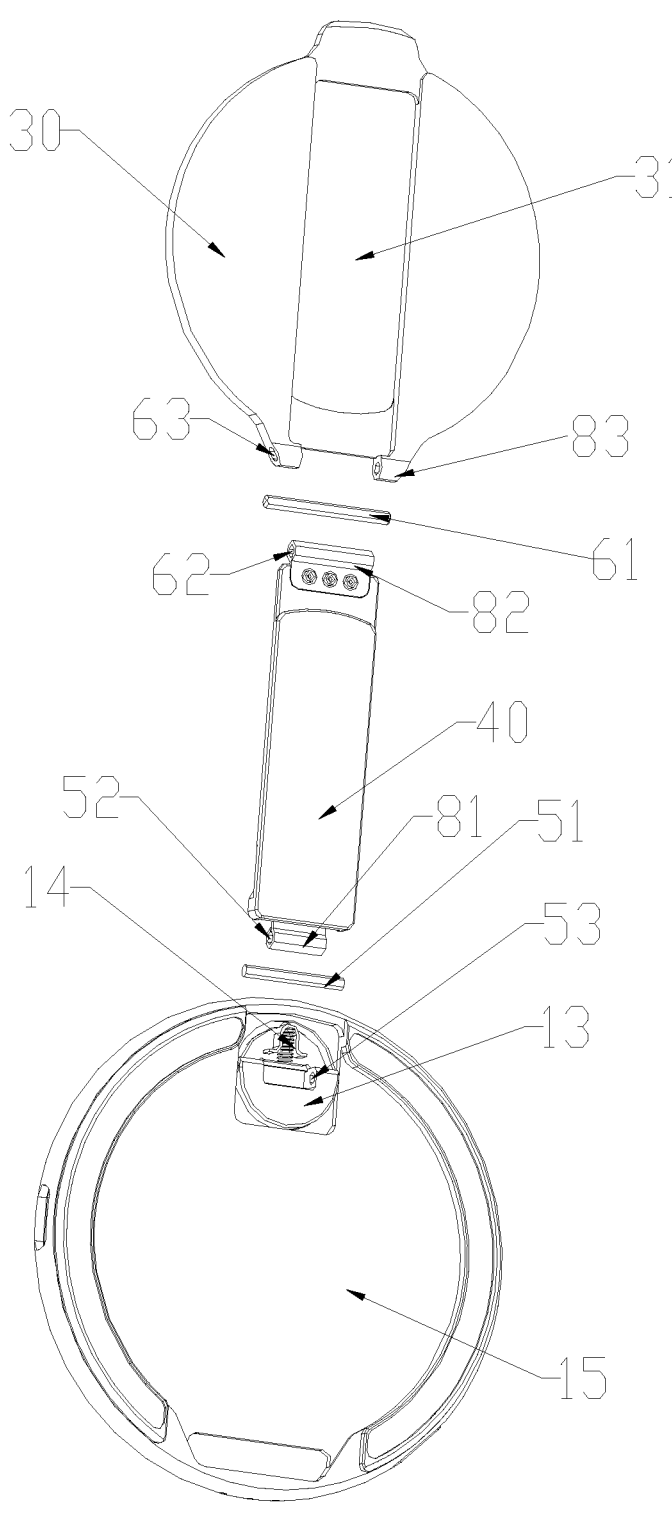
FIG. 8 shows another exploded view of the multifunctional cosmetic mirror in accordance with some embodiments of the present disclosure.
Figure 9:
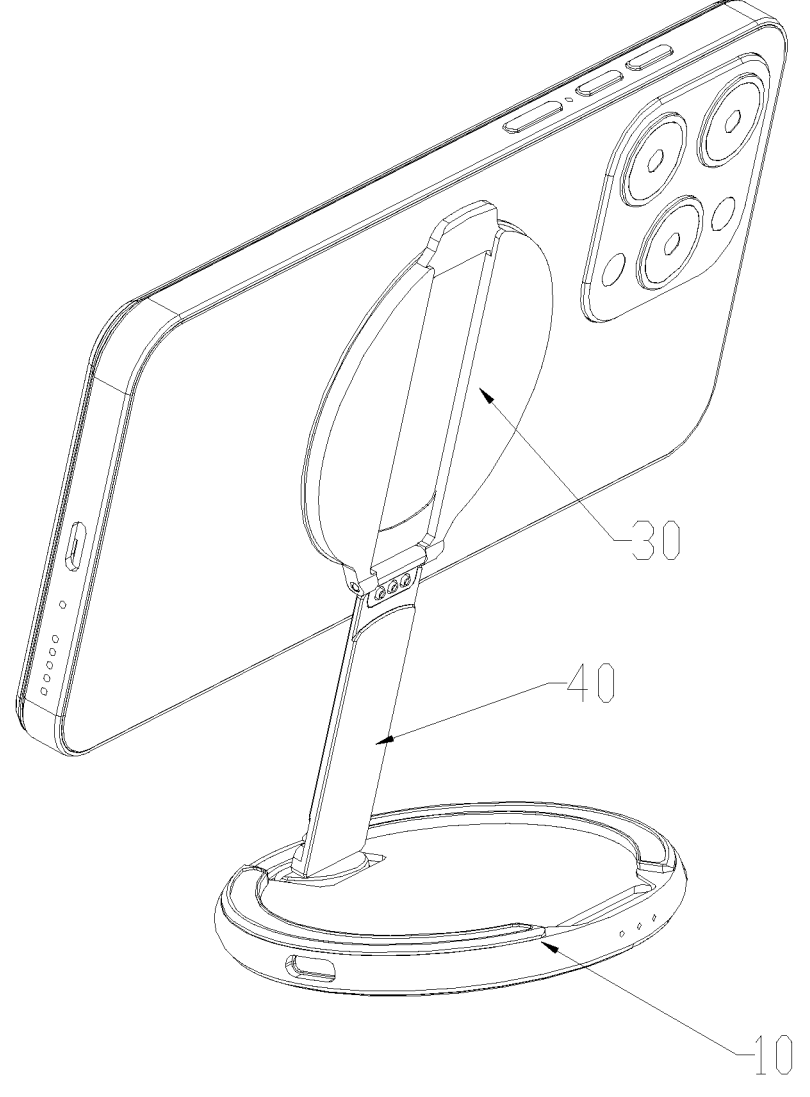
FIG. 9 shows another schematic diagram of the usage state of the multifunctional cosmetic mirror in accordance with some embodiments of the present disclosure.

Of course, in addition to above, the support arm 40 and the magnetic base 30 may also be configured with other structures. For example, as shown in FIG. 8 and FIG. 9, the support arm 40 can be configured to include a connecting arm, a first connecting junction 81 connected to one end of the connecting arm, and a connecting block 82 connected to the other end of the connecting arm. The first mounting cavity 52 is set on the first junction 81, and the second mounting cavity 62 is set on the connecting block 82. The magnetic base 30 includes a connecting seat and a second junction 83 connected to the connecting seat, and the second mounting cavity 62 is set on the second junction 83.

The above embodiments are only some preferred embodiments of the present disclosure and cannot be used to limit the scope of protection of the present invention. Any non-substantial changes and replacements made by one ordinary skill in the art based on the present disclosure shall fall within the scope of protection of the present invention.

What is claimed is:

1. A multifunctional cosmetic mirror, comprising a mirror body, a lighting unit, a magnetic base, a rotary seat, and a support arm;

wherein the lighting unit is set on the mirror body, the rotary seat is rotatably installed on the mirror body, one end of the support arm is pivotally installed on the rotary seat, and another end of the support arm is pivotally installed on the magnetic base; and wherein the magnetic base is provided with a caulking groove for embedding the support arm, and the mirror body is provided with a locating groove for embedding the magnetic base.

2. The multifunctional cosmetic mirror according to claim 1, wherein the mirror body comprises a mirror base and a mirror, and the mirror is set on the mirror base.

3. The multifunctional cosmetic mirror according to claim 2, wherein the rotary seat is rotatably installed on the mirror base.

4. The multifunctional cosmetic mirror according to claim 3, wherein an elastic positioning member is provided between the rotary seat and the mirror base for positioning the rotary seat on the mirror base.

5. The multifunctional cosmetic mirror according to claim 2, wherein the mirror base comprises a base and a top cover, the lighting unit is located in a cavity enclosed by the top cover and the base, the top cover comprises a main body, and the mirror is set on the main body; and wherein the lighting unit comprises a light panel and multiple lights set on the light panel, the top cover further comprises a light transmission part facing the multiple lights, and the light transmission part is arranged around a periphery of the main body.

6. The multifunctional cosmetic mirror according to claim 1, wherein the magnetic base is configured for magnetic adsorption onto the mirror body.

7. The multifunctional cosmetic mirror according to claim 1, wherein the magnetic base is a base provided with a magnet.

8. The multifunctional cosmetic mirror according to claim 1, wherein the support arm is pivotally installed on the rotary seat through a first support shaft, the support arm is provided with a first mounting cavity, and the first support shaft is installed inside the first mounting cavity; and wherein the rotary seat is provided with a first insertion hole, and the first support shaft is inserted into the first insertion hole.

9. The multifunctional cosmetic mirror according to claim 1, wherein the support arm is pivotally installed on the magnetic base through a second support shaft, the support arm is provided with a second mounting cavity, and the second support shaft is installed inside the second mounting cavity; and wherein the magnetic base is provided with a second insertion hole, and the second support shaft is inserted into the second insertion hole.

10. The multifunctional cosmetic mirror according to claim 1, wherein the magnetic base is configured for magnetic adsorption onto mobile phones.

* * * * *